US010539660B2

(12) United States Patent
Berezin et al.

(10) Patent No.: US 10,539,660 B2
(45) Date of Patent: Jan. 21, 2020

(54) SELF-LEARNING SYSTEM FOR REFLECTIVE ENVIRONMENTS

(71) Applicant: GM GLOBAL TECHNOLOGY OPERATIONS LLC, Detroit, MI (US)

(72) Inventors: Vyacheslav Berezin, Newmarket (CA); Shaun S. Marshall, Port Perry (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 15/490,600

(22) Filed: Apr. 18, 2017

(65) Prior Publication Data

US 2017/0315215 A1 Nov. 2, 2017

Related U.S. Application Data

(60) Provisional application No. 62/329,874, filed on Apr. 29, 2016.

(51) Int. Cl.
*G01S 7/41* (2006.01)
*G01S 13/93* (2006.01)
*G01S 13/42* (2006.01)

(52) U.S. Cl.
CPC .............. *G01S 7/412* (2013.01); *G01S 13/42* (2013.01); *G01S 13/931* (2013.01)

(58) Field of Classification Search
None
See application file for complete search history.

(56) References Cited

U.S. PATENT DOCUMENTS

| 2011/0063861 | A1* | 3/2011 | Edgeworth | ............ B60Q 1/143 |
| | | | | 362/466 |
| 2015/0309165 | A1* | 10/2015 | Elwart | ................... G01S 7/4026 |
| | | | | 342/61 |
| 2017/0059703 | A1* | 3/2017 | Hoare | ................... G01S 13/862 |

(Continued)

FOREIGN PATENT DOCUMENTS

| CN | 104512412 A | 4/2015 |
| CN | 104527644 A | 4/2015 |

(Continued)

OTHER PUBLICATIONS

State Intellectual Property Office of the People's Republic of China, Office Action for Chinese Patent Application No. 201710295992.9 dated Apr. 2, 2019.

*Primary Examiner* — Nicholas K Wiltey
(74) *Attorney, Agent, or Firm* — Lorenz & Kopf, LLP (57) ABSTRACT

In accordance with various embodiments, methods, systems, and vehicles are provided for determining an environment of vehicles. In one embodiment, a vehicle includes a body, a plurality of sensors, and a processor. The plurality of sensors are disposed onboard the vehicle, and is configured to at least facilitate transmitting signals from a vehicle and receiving return signals at the vehicle after the transmitted signals have contacted one or more objects. The processor is disposed onboard the vehicle, and is coupled to the plurality of sensors. The processor is configured to at least facilitate identifying one or more parameters of the return signals; comparing the one or more parameters with historical data stored in a memory; and determining an environment of the vehicle based at least in part on the comparison of the one or more parameters with the historical data.

16 Claims, 6 Drawing Sheets

(56) References Cited

U.S. PATENT DOCUMENTS

| | | | | |
|---|---|---|---|---|
| 2017/0176592 A1* | 6/2017 | Hoare | ............... | B60W 50/082 |
| 2017/0274787 A1* | 9/2017 | Salter | ............... | B60L 11/1829 |
| 2017/0349170 A1* | 12/2017 | Sawada | ............... | B60T 7/12 |
| 2018/0007507 A1* | 1/2018 | Ghabra | ............... | H04B 1/3822 |
| 2018/0292506 A1* | 10/2018 | Bjorkengren | ......... | H04W 4/029 |
| 2019/0122056 A1* | 4/2019 | Tran | ............... | G01S 7/527 |
| 2019/0265352 A1* | 8/2019 | Matsunaga | ............... | E04H 6/18 |

FOREIGN PATENT DOCUMENTS

| | | | |
|---|---|---|---|
| CN | 104590025 A | 5/2015 | |
| CN | 104590274 A | 5/2015 | |
| CN | 104602982 A | 5/2015 | |

* cited by examiner

SELF-LEARNING SYSTEM FOR REFLECTIVE ENVIRONMENTS

CROSS REFERENCES TO RELATED APPLICATIONS

This application claims the benefit of U.S. Provisional Application No. 62/329,874, filed Apr. 29, 2016, the entirety of which is hereby incorporated by reference herein.

TECHNICAL FIELD

The technical field generally relates to vehicles, and more particularly relates to antenna and radio systems for vehicles.

BACKGROUND

Current vehicles have features that are dependent, in whole or in part, on an environment surrounding the vehicle. However, current techniques may not always provide optimal determinations of surroundings of a vehicle.

Accordingly, it may be desirable to provide improved methods and systems for determining and implementing an environment surrounding a vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes transmitting signals from a vehicle; receiving return signals at the vehicle after the transmitted signals have contacted one or more objects; identifying one or more parameters of the return signals; comparing the one or more parameters with historical data stored in a memory; and determining an environment of the vehicle based at least in part on the comparison of the one or more parameters with the historical data.

In accordance with another exemplary embodiment, a system is provided. The system includes a plurality of sensors and a processor. The plurality of sensors are configured to at least facilitate transmitting signals from a vehicle and receiving return signals at the vehicle after the transmitted signals have contacted one or more objects. The processor is coupled to the plurality of sensors, and is configured to at least facilitate identifying one or more parameters of the return signals; comparing the one or more parameters with historical data stored in a memory; and determining an environment of the vehicle based at least in part on the comparison of the one or more parameters with the historical data.

In accordance with a further exemplary embodiment, a vehicle is provided. The vehicle includes a body, a plurality of sensors, and a processor. The plurality of sensors are disposed onboard the vehicle, and are configured to at least facilitate transmitting signals from a vehicle and receiving return signals at the vehicle after the transmitted signals have contacted one or more objects. The processor is disposed onboard the vehicle, and is coupled to the plurality of sensors. The processor is configured to at least facilitate identifying one or more parameters of the return signals; comparing the one or more parameters with historical data stored in a memory; and determining an environment of the vehicle based at least in part on the comparison of the one or more parameters with the historical data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
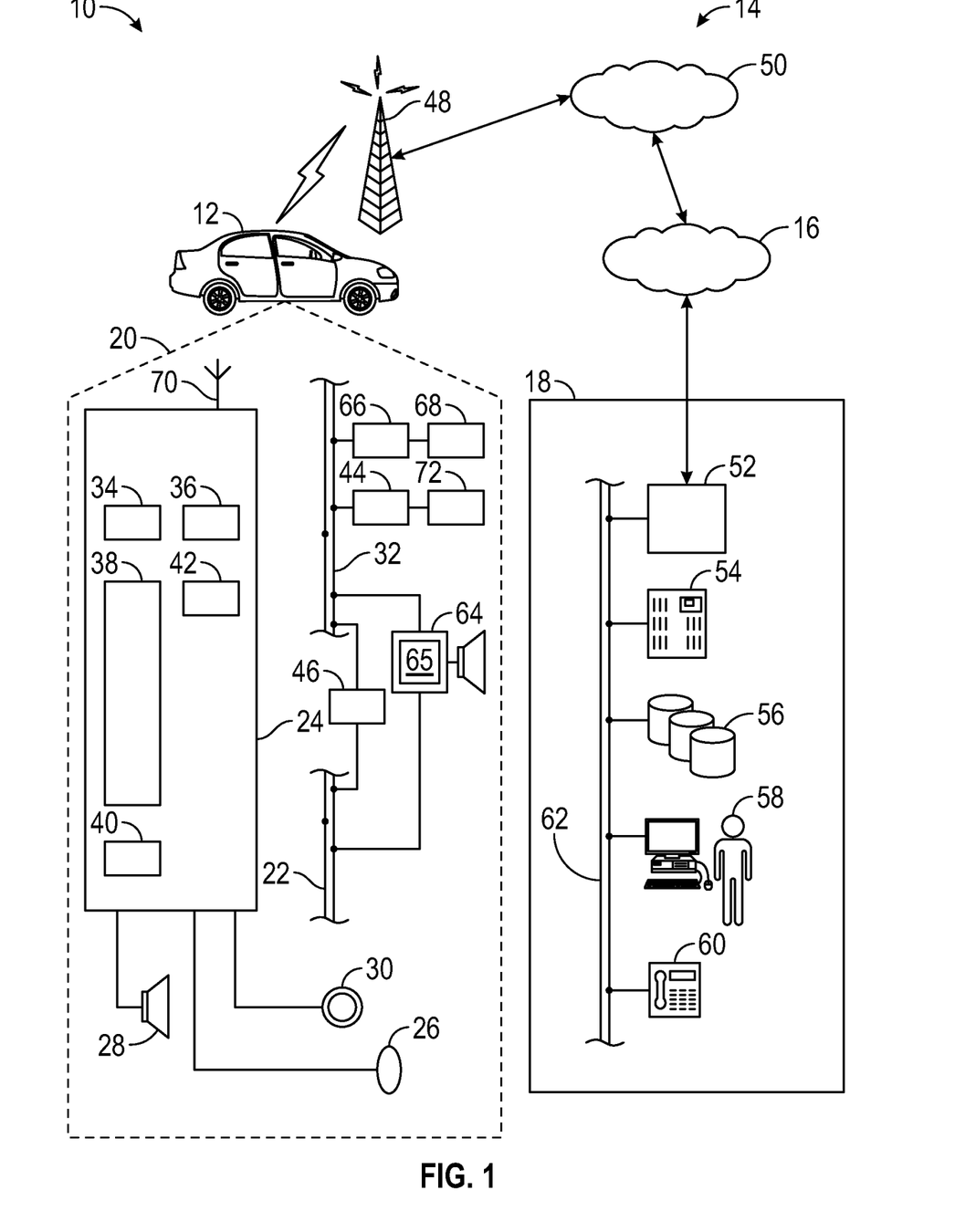
FIG. 1 is a functional block diagram of a communication system that includes a vehicle that is configured to help to determine and implement an environment surrounding the vehicle, in accordance with an exemplary embodiment.

FIG. 1 is a functional block diagram of a communication system 10, in accordance with an exemplary embodiment. As described in further greater detail further below, the communication system 10 includes a vehicle 12 that is configured to help to determine and implement an environment surrounding the vehicle 12 (e.g., for improved locations of cell phones, keyfobs, and/or other transceivers of users of the vehicle 12), in accordance with an exemplary embodiment.

As depicted in FIG. 1, communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, or the like, and is equipped with suitable hardware and software that enables it to communicate over communication system 10. As shown in FIG. 1, in various embodiments the vehicle hardware 20 includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

The telematics unit 24 may provide various services, including determining and implementing an environment detection surrounding the vehicle 12, in accordance with the description of the control system 102 described further below in connection with FIG. 2, in accordance with an exemplary embodiment. In addition, in various embodiments, the telematics unit 24 may also provide other services, such as, by way of example: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
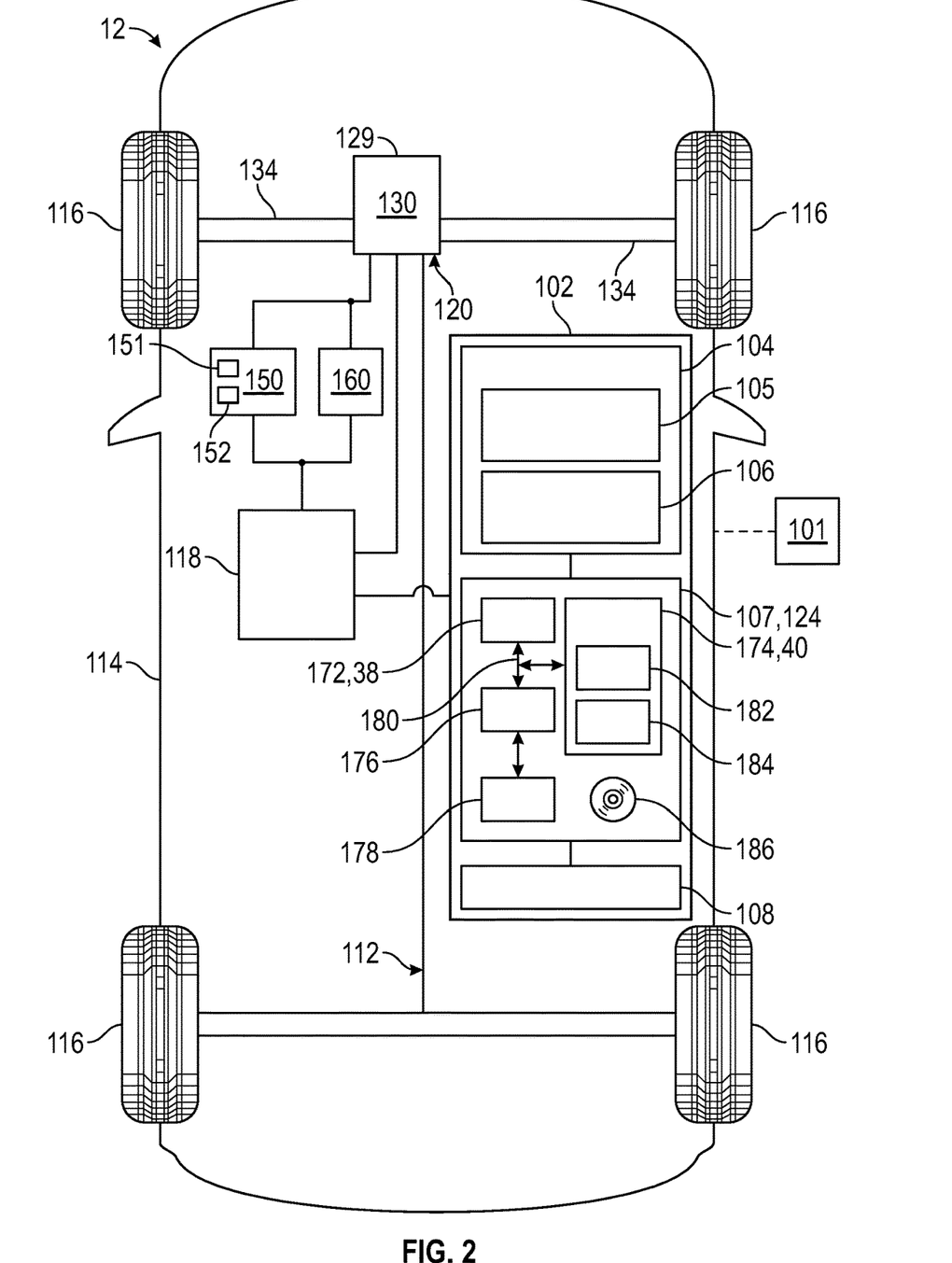
FIG. 2 is a functional block diagram of the vehicle of FIG. 1, including a control system thereof that is configured to help to determine and implement an environment surrounding a vehicle, in accordance with an exemplary embodiment.

With reference to FIG. 2, also in one embodiment, the vehicle 12 includes a control system 102 for controlling one or more functions of the vehicle 12, including determining and implementing an environment surrounding the vehicle 12, including for improved location of a user transceiver 101 (e.g., a cell phone, key fob, and/or other transceivers of users of the vehicle 12), in accordance with an exemplary embodiment. As discussed further below, in one embodiment the control system 102 includes a sensor array 104 that includes one or more transmitting sensors 105 and one or more receiving sensors 106.

As depicted in FIG. 2, the vehicle 12 includes, in addition to the above-referenced control system 102, a chassis 112, a body 114, four wheels 116, an electronic control system (ECS) 118, a steering system 150, and a braking system 160. The body 114 is arranged on the chassis 112 and substantially encloses the other components of the vehicle 12. The body 114 and the chassis 112 may jointly form a frame. The wheels 116 are each rotationally coupled to the chassis 112 near a respective corner of the body 114. In various examples the vehicle 12 may differ from that depicted in FIG. 1. For example, in certain examples the number of wheels 116 may vary. By way of additional example, in various examples the vehicle 12 may not have a steering system, and for example may be steered by differential braking, among various other possible differences.

In the example illustrated in FIG. 2, the vehicle 12 includes an actuator assembly 120. The actuator assembly 120 includes at least one propulsion system 129 mounted on the chassis 112 that drives the wheels 116. In the depicted example, the actuator assembly 120 includes an engine 130. In one example, the engine 130 comprises a combustion engine. In other examples, the actuator assembly 120 may include one or more other types of engines and/or motors, such as an electric motor/generator, instead of or in addition to the combustion engine. In certain examples, the electronic control system 118 comprises an engine control system that controls the engine 130 and/or one or more other systems of the vehicle 12.

Still referring to FIG. 2, the engine 130 is coupled to at least some of the wheels 116 through one or more drive shafts 134. In some examples, the engine 130 is mechanically coupled to the transmission. In other examples, the engine 130 may instead be coupled to a generator used to power an electric motor that is mechanically coupled to the transmission. In certain other examples (e.g. electrical vehicles), an engine and/or transmission may not be necessary.

The steering system 150 is mounted on the chassis 112, and controls steering of the wheels 116. In the depicted example, the steering system 150 includes a steering wheel 151 and a steering column 152. The braking system 160 is mounted on the chassis 112, and provides braking for the vehicle 12.

The control system 102 is mounted on the chassis 112. As discussed above, the control system 102 controls one or more functions of the vehicle 12, including determining and implementing an environment surrounding the vehicle 12, including for improved location of a user transceiver 101 (e.g., a cell phone, key fob, and/or other transceivers of users of the vehicle 12), in accordance with an exemplary embodiment. Also as noted above, in one embodiment the control system 102 includes a sensor array 104 that includes one or more transmitting sensors 105 and one or more receiving sensors 106. In certain embodiments, the control system 102 also includes a notification unit 108.

As noted above, the sensor array 104 includes various sensors including both transmitting sensors 105 and receiving sensors 106. In various embodiments, the transmitting sensors 105 and receiving sensors 106 are disposed at various locations on the body 114 of the vehicle 12, such as, by way of example only, on the roof, on the front, on the rear, on the passenger side, and on the driver side of the vehicle 12. Also in various embodiments, the transmitting sensors 105 transmit signals, such as radio, cellular, GPS, and/or other wireless signals, away from the vehicle 12. Also in various embodiments, the receiving sensors 106 receive return signals, such as radio, cellular, GPS, and/or other wireless signals, after the transmitted signals are reflected off walls, other vehicles, and/or other objects that may be in proximity to the vehicle 12. In addition, in certain embodiments, the sensor array 104 is part of, includes, and/or is coupled to and/or associated with the radio system 65, antenna 70, and sensors 72 of FIG. 1, among other possible components of the vehicle 12 of FIG. 1.

As depicted in FIG. 2, the controller 107 comprises a computer system. In one embodiment, the controller 107 corresponds to, is part of, or is coupled to the telematics unit 24 of FIG. 1. In certain examples, the controller 107 may also include one or more of the sensors of the sensor array 104, the notification unit 108, one or more other devices and/or systems, and/or components thereof. In addition, it will be appreciated that the controller 107 may otherwise differ from the example depicted in FIG. 2. For example, the controller 107 may be coupled to or may otherwise utilize one or more remote computer systems and/or other control systems, such as the electronic control system 118, and/or one or more other systems of the vehicle 12.

In the depicted example, the computer system of the controller 107 includes a processor 172, a memory 174, an interface 176, a storage device 178, and a bus 180. In one example, the processor 172 and memory 174, correspond to the electronic processing device 38 and electronic memory 40, respectively, of FIG. 1. The processor 172 performs the computation and control functions of the controller 107, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 107 and the computer system of the controller 107, generally in executing the processes described herein.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172.

In the depicted example, the memory 174 stores the above-referenced program 182 along with various stored matter.

The bus 180 serves to transmit programs, data, status and other information or signals between the various components of the computer system of the controller 107. The interface 176 allows communication to the computer system of the controller 107, for example from a system driver and/or another computer system, and can be implemented using any suitable method and apparatus. In one example, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one example, the storage device 178 comprises a program product from which memory 174 can receive a program 182 that executes one or more examples of one or more processes of the present disclosure. In another example, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 107 may also otherwise differ from the example depicted in FIG. 2, for example in that the computer system of the controller 107 may be coupled to or may otherwise utilize one or more remote computer systems and/or other control systems.

The notification unit 108 is coupled to the controller 107, and provides notifications for the driver of the vehicle 12. In certain examples, the notification unit 108 provides audio, visual, haptic, and/or other notifications to the driver with information as to the identified characteristics of the environment, the location of the transceiver 101 (e.g. cell phone or keyfob), and/or actions based on these determinations (e.g. if the vehicle is not starting because the transceiver is disposed outside the vehicle, and so on), among other possible notifications.

While the components of the control system 102 (including the sensor array 104, the controller 107, and the notification unit 108) are depicted as being part of the same system, it will be appreciated that in certain examples these features may comprise two or more systems. In addition, in various examples the control system 102 may comprise all or part of, and/or may be coupled to, various other vehicle devices and systems, such as, among others, the actuator assembly 120, the electronic control system 118, and/or one or more other systems of the vehicle 12.

Figure 3:
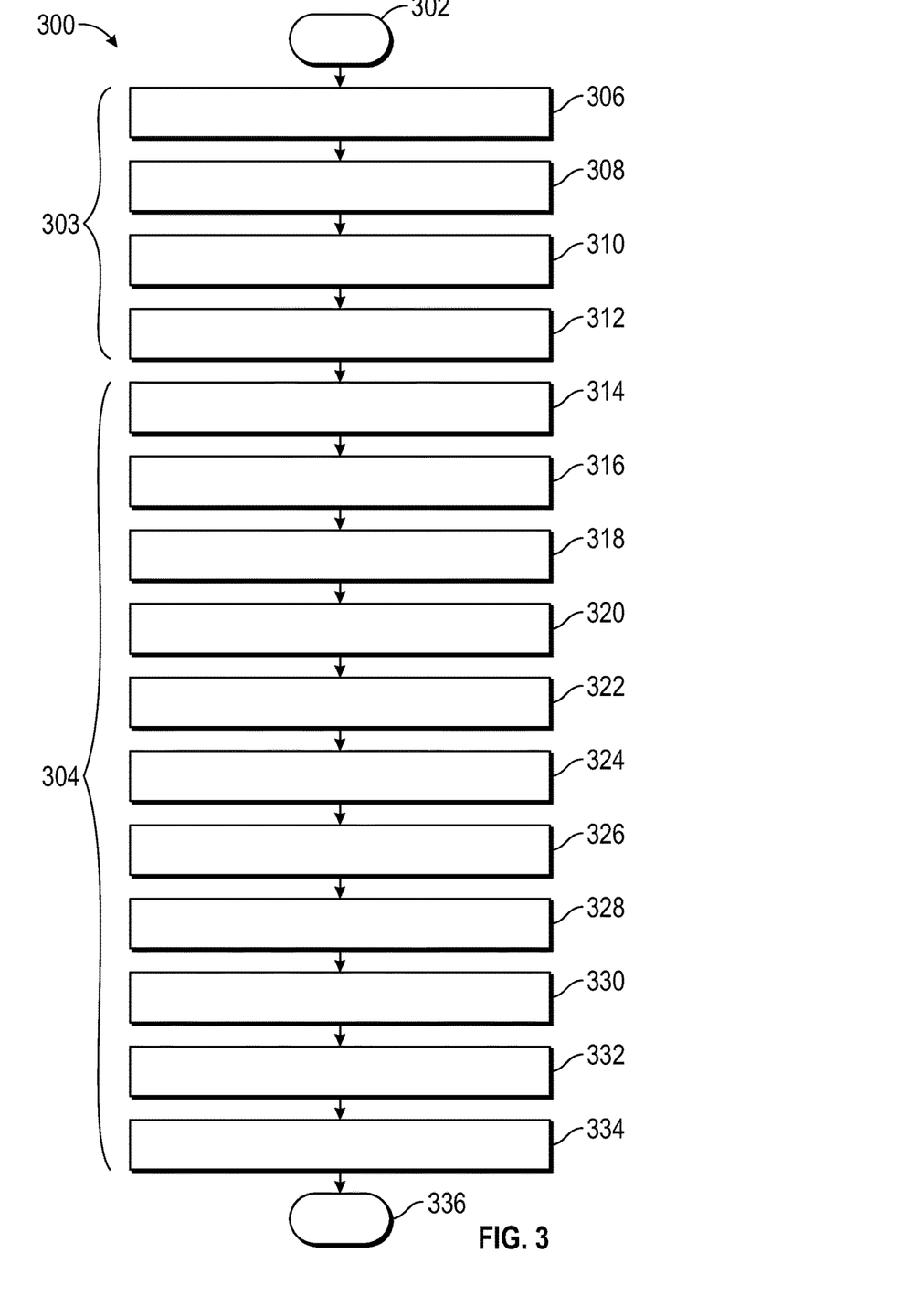
FIG. 3 is a flowchart of a process for determining and implementing an environment surrounding a vehicle, and that can be used in connection with the vehicle and communication system of FIGS. 1 and 2, in accordance with an exemplary embodiment.

FIG. 3 is a flowchart of a process 300 for determining and implementing an environment surrounding a vehicle, in accordance with an exemplary embodiment. The process 300 can be used in connection with the vehicle 12 and communication system 12 of FIGS. 1 and 2, and components thereof, in accordance with an exemplary embodiment. The process 300 will also be discussed further below with reference to FIGS. 4-6, which provide illustrations for implementations that include the vehicle 12 of FIGS. 1 and 2 depicted within its environment as the process 300 of FIG. 3 is being executed, in accordance with exemplary embodiments.

As depicted in FIG. 3, in various embodiments the process 300 begins at step 302. Also in various embodiments, the process 300 may include two stages. During a first stage 303, steps are performed prior to a current vehicle drive cycle (e.g., ignition cycle), including the collection and storage of historical data. During a second stage 304, steps are performed during a current vehicle drive cycle (e.g., ignition cycle) for the vehicle. It will be appreciated that in certain embodiments the steps of the first stage 303 and the second stage 304 may be performed, in whole or in part, within and/or by the same vehicle (e.g., vehicle 12 of FIG. 1 and). It will also be appreciated that in certain other embodiments the steps of the first stage 303 may be performed by one or more different vehicles (e.g., test vehicles) from the vehicle 12, and that the steps of the second stage 304 may be performed by the test vehicle 12 of FIGS. 1 and 2 (e.g., in such embodiments, the vehicle 12 may already have the results from the first stage 303 stored in the memory 174 of the vehicle 12, and the process 300 may effectively begin for the vehicle 12 during a current vehicle drive with step 314, in certain embodiments).

During step 306, a data collection stage begins. As part of the data collection stage, data is collected from one or more test vehicles at various different known environments at step 308.

In various embodiments, during step 308, signals are transmitted and received by the test vehicles with respect to different environments that include, by way of example, (i) a vehicle parked in an open parking location (e.g., with no walls or other vehicles on either side); (ii) a vehicle parked against a wall on one side and an open space on another side; (iii) a vehicle parked between two walls; (iv) a vehicle parked between a wall on one side and another vehicle on the other side; (v) a vehicle parked between two other vehicles, and so on. Also in various embodiments, signals are transmitted from the test vehicles via one or more transmitting sensors, and return signals are received via one or more receiving sensors after deflecting off one or more walls, other vehicles, and/or other objects that may be in proximity to the test vehicle, all while the test vehicle is known to be in a particular type of environment (such as one of the exemplary environments noted above).

Also in certain embodiments, the signals correspond to radio signals from a radio system of the test vehicle. In addition, in various embodiments, parameters are measured with respect to the return signals that are received at the test vehicle. In one embodiment, signal strength (e.g., also commonly referred to as "received signal strength indicator" or "RSSI") is measured and/or otherwise determined for the return signals with respect to each of the environments at which the test vehicle is located during the data collection stage. In certain embodiments, the signal strength is reported from one or more devices, such as a keyfob, cellular phone, and/or other electronic device, and/or is measured by receiving sensors of the vehicle and/or determined via the processor based on data or information obtained therefrom. In various other embodiments, one or more other parameters of the return signals (e.g., the received signals) may also be measured, such as a phase of the return signals, a frequency of the return signals, and/or a timing (e.g., an elapsed amount of time, an average elapsed amount of time, or the like, between the transmitted signals and the return signals, and/or an elapsed amount of time, an average elapsed amount of time, or the like, between different return signals) of the return signals.

As noted above, in certain embodiments, the test vehicles may comprise the vehicle 12 of FIGS. 1 and 2 (e.g., the vehicle in which the second stage 304 of the process 300 will ultimately be implemented). Also as noted above, in certain embodiments the test vehicles may be different from the vehicle 12 in which the second stage 304 of the process 300 will ultimately be implemented (but may still have similar features as the vehicle 12 depicted in FIGS. 1 and 2).

In various embodiments, the data collection of step 308 is performed many times, preferably continuously, each at many different types of environments (such as those discussed above), and average values are determined for each type of environment at step 310. For example, in certain embodiments, average signal strength values (e.g., moving average signal strength values, in one embodiment) are determined for each of the different types of environments. In certain embodiments, patterns of average strength of signal values (e.g., strength of signal values for different sensors 104 located on different parts of the vehicle 12) are determined for each particular type of environment. Also in various embodiments, average values and/or patterns of average values of one or more other parameters of the return signals (e.g., phase, frequency, and/or timing of the return signals) may also be determined for each particular type of environment.

The results of the data collection are stored in memory at step 312. In certain embodiments, the average values for each type of environment are stored in the memory 174 of the vehicle 12 of FIGS. 1 and 2 as stored values 184 thereof, for subsequent look-up during a current vehicle drive cycle for the vehicle 12 during the second stage 304 of the process 300, as discussed below. For example, in certain embodiments, the average signal strength values (and/or average values of phase, frequency, timing, and/or other parameter values) for each of the different types of environments are stored in memory. Also in certain embodiments, by way of additional example, patterns of average strength of signal values (e.g., strength of signal values for different sensors 104 located on different parts of the vehicle 12) and/or patterns of other average parameter values (e.g., phase, frequency, timing, and/or other parameter values) for each particular type of environment are stored in memory.

With continued reference to FIG. 3, in certain embodiments, the second stage 304 of the process 300 beings during a current vehicle drive cycle (e.g., a current ignition cycle) for the vehicle 12 of FIGS. 1 and 2 at step 314. In one embodiment, once the current vehicle drive cycle begins (e.g., once an engine of the vehicle 12 is started, a passenger approaches or enters the vehicle 12, a start request is received (e.g., via a key, push button, keyfob, or the like), the control system 102 is initialized at step 316. In one embodiment, the control system 102 is initialized via the processor 172 of FIG. 1.

Signals are transmitted from the vehicle at step 318. In various embodiments, the transmitted signals are transmitted away from the vehicle 12 via the transmitting sensors 105 of FIG. 2. Also in one embodiment, the signals comprise radio signals of a radio system of the vehicle 12. However, this may vary in other embodiments.

Signals are subsequently received at step 320. In various embodiments, return signals are received at the vehicle 12 via the receiving sensors 106 of FIG. 2. Also in one embodiment, the return signals comprise radio signals. However, this may vary in other embodiments.

One or more signal parameters are identified, measured, and/or determined at step 322. For example, in one embodiment, signal strength values (and/or other parameter values, such as phase, frequency, and/or timing) are identified, measured, and/or determined for the return signals. In addition, in certain embodiments, patterns of signal strength values (e.g., strength of signal values for different sensors 104 located on different parts of the vehicle 12) and/or other parameter values (such as phase, frequency, and/or timing) are determined for the return signals. In certain embodiments, the signal parameters are measured by the transmitting sensors (themselves) 105 of FIG. 2. In certain embodiments, the signal parameters are identified and/or determined by the processor 172 of FIG. 2 based upon information and/or data provided via the transmitting sensors 105, and/or are reported from one or more devices, such as the user transceiver 101 (e.g., a keyfob, cellular phone, and/or other electronic device).

The signal parameters are compared with historical data at step 324. In certain embodiments, the signal parameters of step 322 are compared with respective signal parameters from the historical data from the memory 174 of FIG. 2 (i.e., based on the data collection and associated steps 306-312 discussed above). For example, in certain embodiments, the signal strengths and/or signal strength patterns (e.g., the signal strength as measured and/or determined with respect to receiving sensors 106 at different locations of the vehicle 12) and/or other parameter values (such as phase, frequency, and/or timing are compared with the stored signal strengths and/or signal strength patterns (and/or stored values and/or patterns of other parameters) of the various environments from the historical data. In certain embodiments, the comparison is performed by the processor 172 of FIG. 2 using the historical data stored in the memory 174 of FIG. 2 as stored values 184 thereof.

An environment of the vehicle 12 is determined at step 326. In certain embodiments, the environment in which the vehicle 12 is located is determined by the processor 172 of FIG. 2 based on the comparison of step 324. For example, in certain embodiments, during step 326 it is determined which environment(s) from the historical data have recorded parameter values (e.g., signal strength, and/or signal strength patterns, such as at different locations of the vehicle 12, and/or other parameter values such as phase, frequency, timing, and/or patterns pertaining thereto) in the historical data of step 312 are most similar to the signal parameters of step 322, in accordance with the comparison of step 324.

In certain embodiments, this determination is made by the processor 172 of FIG. 2, with reference to various different possible environments such as (i) a vehicle parked in an open parking location (e.g., with no walls or other vehicles on either side); (ii) a vehicle parked against a wall on one side and an open space on another side; (iii) a vehicle parked between two walls; (iv) a vehicle parked between a wall on one side and another vehicle on the other side; (v) a vehicle parked between two other vehicles, and so on.

In certain embodiments, the environment is reported for the passenger or other user, for example via the notification unit 108 of FIG. 2 (and/or is transmitted to the user transceiver 101, such as a smart phone and/or other electronic device or service of the user) in accordance with instructions provided by the processor 172 of FIG. 2.

A location of the vehicle 12 is determined at step 328. In certain embodiments, the location of the vehicle 12 is determined by the processor 172 of FIG. 2 based on the return signals of step 320, the signal parameters of step 322, and the comparison of step 324. For example, in certain embodiments, the characterization of the environment is utilized to calibrate an algorithm that is used to determine a location of a transceiver of a user (e.g. a driver) of the vehicle, such as a cell phone or key fob (e.g., based on whether walls, vehicles, and/or other objects are disposed in proximity to the vehicle 12, and if so on what sides of the vehicle 12 the objects are located, and so on).

In certain embodiments, the same sensors that were used to transmit and receive the signals in identifying the environment are subsequently used to identify the location of the transceiver. In various embodiments, the transmitting sensors transmit similar signals to the transceiver, and the receiving sensors receive return signals from the transceiver. Also in certain embodiments, the same signals are used to identify the environment as to locate the transceiver. The calibration of the algorithm (based on the identified environment) is used to interpret the return signals that are received via the vehicle sensors from the transceiver. For example, based on the identification of the wall, other vehicle or object(s), and/or other features of the environment, the processor can improve its interpretation and analysis of the return signals (and strength of signal, phase, frequency, and timing thereof) from the transceiver (for example, by knowing what to expect from the signals and their strength, phase, frequency, timing, and so on, upon reflection off a wall, another vehicle or other object, and so on).

Adjustments are determined at step 330. In certain embodiments, one or more adjustments may be determined for the operation of one or more vehicle systems based on the environment. For example, in certain embodiments, the adjustment comprises a calibration for one or vehicle systems. Also in certain embodiments, the adjustment comprises a correction factor for a calibration for one or more vehicle systems. In certain embodiments, such calibrations and correction factors can pertain to, but are not limited to, adjustments for the signals transmitted by the transmitting sensors 105 (e.g., of step 318), for example including deltas or changes in signal strength (e.g., RSSI), Time of Flight (ToF), frequency or phase shift, timing, and so on of the transmitted signals.

The adjustments are then implemented in step 332. In various embodiments, the adjustments of step 330 are implemented in accordance with instructions provided by the processor 172 of FIG. 2 to one or more vehicle systems or components thereof. For example, with respect to the above-described examples with regards to changes in the signals transmitted by the transmitting sensors 105 of FIG. 2, in various embodiments the adjustments may be implemented by the transmitting sensors 105 in accordance with instructions provided thereto by the processor 172.

The historical data is updated at step 334. In one embodiment, the processor 172 of FIG. 1 updates the historical data that is stored in the memory 174 as stored values 184 thereof, based on the determinations and adjustments of steps 326-332. In certain embodiments, the historical data is updated after a confirmation is received (e.g., from the user) as to whether the determination of the environment of step 326 is correct.

In various embodiments, the process 300 then terminates at step 336 (for example, at the end of the vehicle drive cycle).

Figure 4:
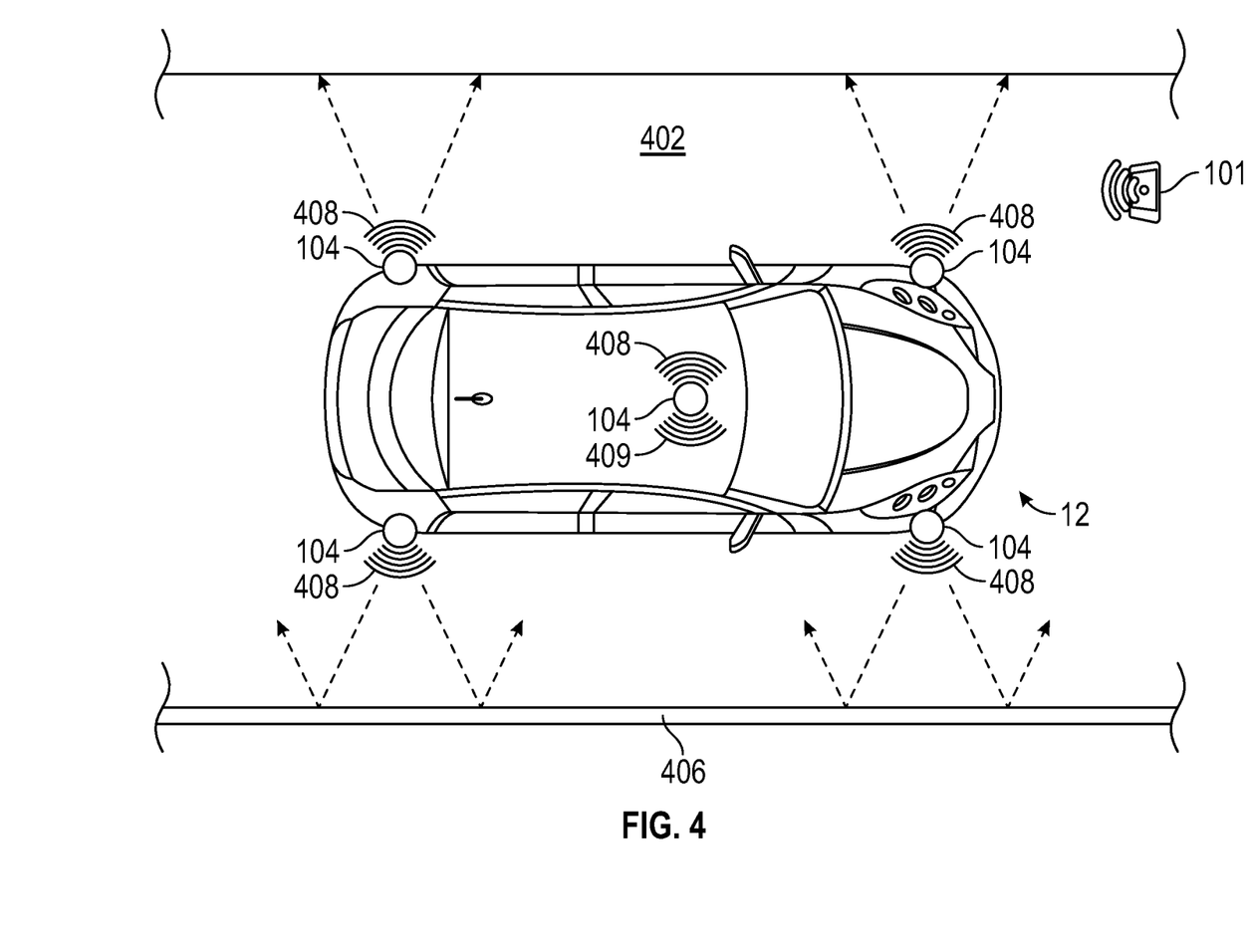
FIGS. 4-6 provide illustrations for implementations of the vehicle and communications system of FIGS. 1 and 2 and the process of FIG. 3, in which the vehicle of FIGS. 1 and 2 is depicted within its environment as the process of FIG. 3 is being executed, in accordance with an exemplary embodiment.
Figure 5:
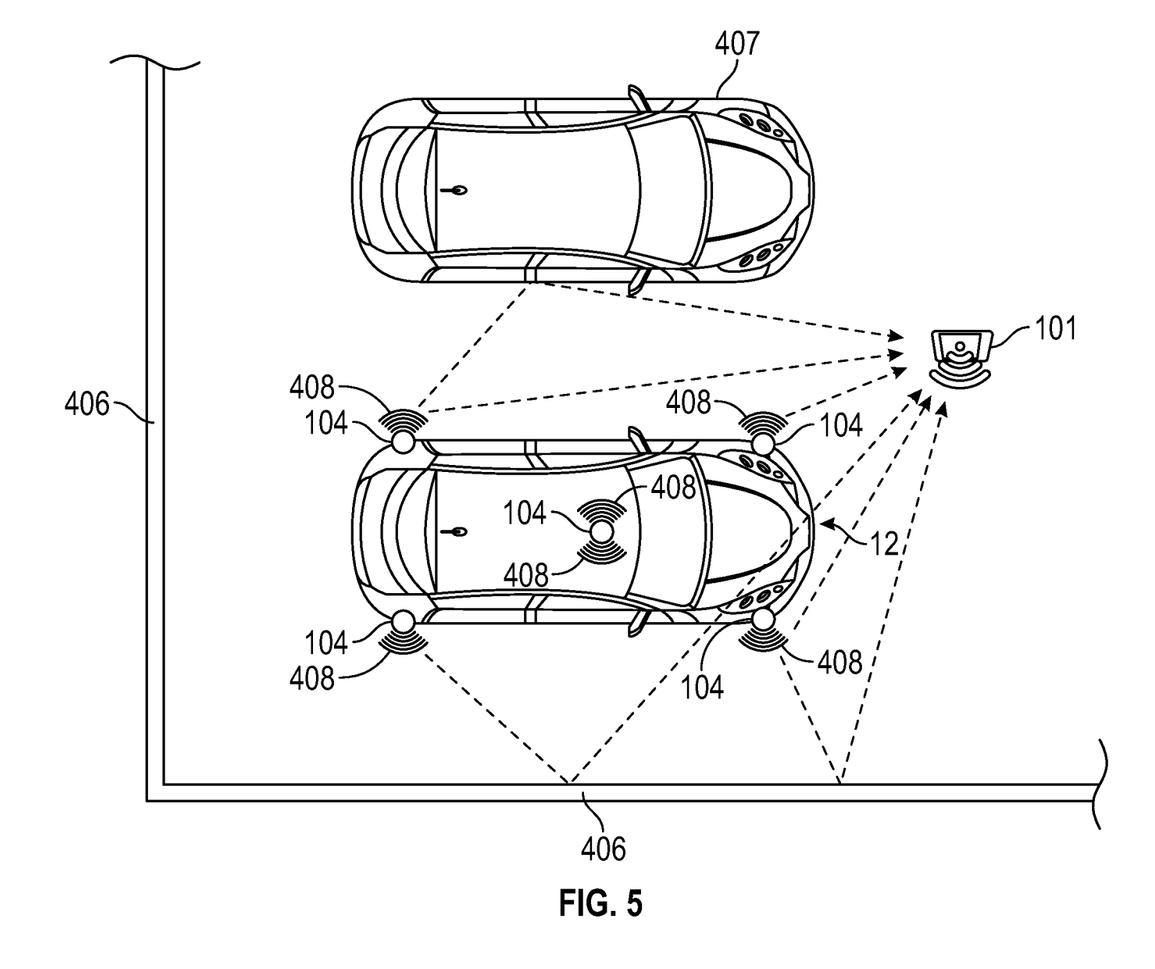
Figure 6:
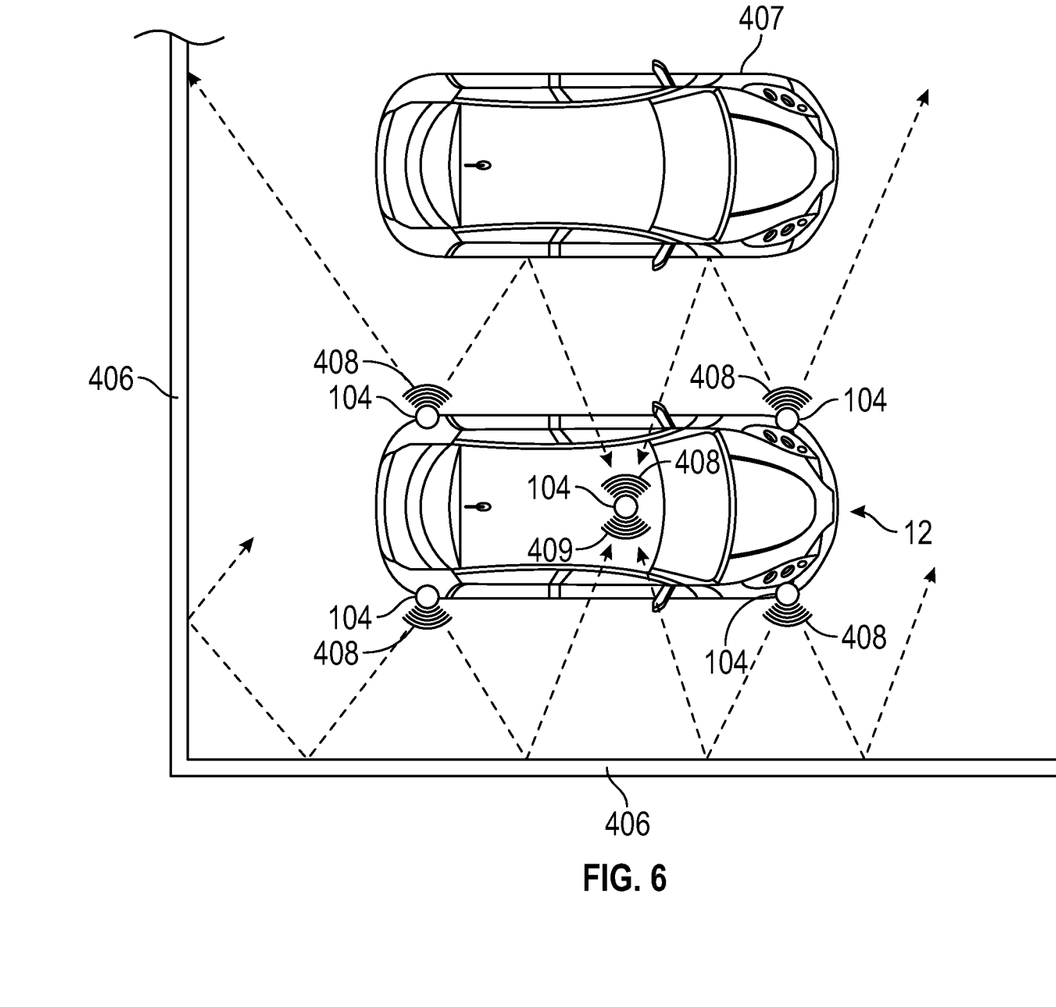

FIGS. 4-6 provide illustrations for implementations that include the vehicle 12 of FIGS. 1 and 2 depicted within its environment as the process 300 of FIG. 3 is being executed, in accordance with exemplary embodiments. Specifically, FIG. 4 depicts the vehicle 12 in a first environment in which there is a wall 406 proximate a passenger side of the vehicle 12 and an open space 402 proximate a driver side of the vehicle 12. FIGS. 5 and 6 both depict the vehicle 12 in a second environment in which walls 406 are disposed proximate the passenger side of the vehicle 12 and behind the vehicle 12, and another vehicle 407 is disposed proximate the driver side of the vehicle 12. Also, a user transceiver 101 (e.g., keyfob or cell phone) is depicted in FIGS. 4 and 5.

In each of FIGS. 4-6, sensors 104 (including transmitting sensors 105 and receiving sensors 106, in one embodiment) are disposed at various locations on the body 114 of the vehicle 12, such as on the roof, near the front of the driver side, near the rear of the driver side, near the front of the passenger side, and near the rear of the passenger side of the vehicle 12.

As shown in FIGS. 4-6, various of the sensors 104 transmit transmitted signals 408 that deflect off objects, such as the walls 406 and the other vehicle 407. Also as shown in FIGS. 4-6, various of the sensors 104 receive return signals 409 after deflection off the walls 406 and the other vehicle 407.

Similar to the discussion above, the analysis of the return signals 409, and the comparison of parameters of the return signals 409 (e.g., signal strength and/or patterns of signal strength, and/or other parameter values, such as phase, frequency, timing, and/or patterns pertaining thereto) with the historical data stored in memory are utilized to determine the type of environment in which the vehicle 12 is presently located (e.g., an environment having a wall 406 on the passenger side and the remainder of the environment being open space 402, as the case in FIG. 4; or an environment having walls 406 on the passenger side and behind the vehicle 12 and another vehicle 407 on the driver side of the vehicle 12, as the case in FIGS. 5 and 6). Also similar to the discussion above, the transmitted and return signals 408 and 409, along with the characterization of the environment surrounding the vehicle 12, are also utilized for improved location of the user transceiver or device 101.

Accordingly, in various embodiments, particularly as the process 300 (particularly, the steps of the second stage 304) is performed with sufficient frequency, the vehicle 12 can quickly adjust to environment changes and react to such dynamic changes as other vehicles or groups of people moving by. In one embodiment, the steps of the second stage 304 are performed repeatedly and continuously throughout the current vehicle drive cycle for the vehicle 12. Also in various embodiments, the adjustments can help to reduce or eliminate system error that might otherwise occur, if these changes in the environment surrounding the vehicle 12 are not accounted for.

The disclosed methods and systems can be beneficial, for example, in finding a solution, at a minimal cost (e.g. a software solution, without requiring additional hardware, in one embodiment), that may result in a technological breakthrough in trying to match passive entry passive art systems (PEPS), including Bluetooth low energy passive entry passive start systems (BLE PEPS) localization accuracy to traditional low frequency passive entry passive start systems (LF PEPS).

In accordance with the discussion above, in certain embodiments, the vehicle utilizes sensors that transmit signals to the environment, with return signals received via sensors of the vehicle. Based on the return signals and the parameters pertaining thereto (e.g., signal strength, phase frequency, and timing), the vehicle (e.g. a processor thereof) makes determinations surrounding the environment of the vehicle. For example, in one example, the processor determines that the environment includes a wall along an entirety of the passenger side of the vehicle, and another vehicle or other object in proximity to most of the length of the vehicle on the driver side of the vehicle. In one embodiment, sensors outside the vehicle (e.g., transmitting sensors) transmit the signals, while sensors inside the vehicle (e.g., receiving sensors) receive the signals (for example, in one example, the signals that were originally transmitted by the transmitting sensors reflect off of one or more objects in the environment and are subsequently received via the receiving sensors inside the vehicle). Also in various embodiments, the determination of the environment surrounding the vehicle can help to provide improved location of one or more devices, such as a keyfob of a user of the vehicle.

Also in certain embodiments, the identification of the environment is dynamically adjusted via additional transmission and receiving of signals, for example on a periodic and/or continuous basis. In addition, in certain embodiments, a comprehensive identification is performed for the determination of the environment, for example including a three hundred and sixty degree analysis of obstacles in the environment surrounding the vehicle.

In certain embodiments, short wave wireless signals (e.g. Bluetooth) are utilized for the identification of the environment and the location of the transceiver. However, this may vary in other embodiments. Also in certain embodiments, signals are provided in a 2.4 GHz wavelength, and/or are used to determine characteristics of the environment as they would affect 2.4 GHz transmissions (e.g. from a phone).

In certain embodiments, the improved localization of the transceiver may be utilized in various different applications. For example, in one embodiment in which the transceiver is utilized for a passive entry and/or start system for the vehicle (e.g. in which the driver is able to freely open a vehicle door, enter the vehicle, and start the vehicle without a key, provided that the driver has his or her cell phone in his or her possession), the doors may remain locked or shut, and/or the vehicle may not be permitted to start, if the transceiver is outside of the vehicle (e.g. even if the transceiver is near the vehicle, for example as with the case of the driver filling the vehicle with fuel). In another embodiment, a single door may be unlocked or opened, but only the door in proximity to the driver and his or her cell phone or other transceiver, among other embodiments. The improved localization techniques may also be used in connection with other vehicle features, such as autonomous driving.

Also per the discussion above, in various embodiments, signals are utilized for identifying or "learning" the environment surrounding a vehicle. In certain embodiments, the environment or learning of the environment is utilized in conditions with multi-path interference, and calibrations for a localization system for the vehicle or a device (for example, a user's cell phone or other transceiver) are dynamically adjusted in accordance with the determinations pertaining to the environment surrounding the vehicle, for example for the purposes of achieving potentially improved localization accuracy.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising: transmitting signals from a vehicle when the vehicle is parked; receiving return signals at the vehicle after the transmitted signals have contacted one or more objects; identifying one or more parameters of the return signals; comparing the one or more parameters with historical data stored in a memory; and determining an environment of the vehicle based at least in part on the comparison of the one or more parameters with the historical data, the environment comprising whether a wall or another vehicle is disposed on one or more sides of the vehicle as the vehicle is parked; and locating a transceiver of a user of the vehicle based on the environment, including based on whether the vehicle has the wall or another vehicle disposed on one or more side of the vehicle as the vehicle is parked.

2. The method of claim 1, wherein: the step of identifying one or more parameters comprises identifying a signal strength of the return signals; the step of comparing the one or more parameters with historical data comprises comparing the signal strength of the return signals with the historical data stored in the memory; and the step of determining an environment of the vehicle based comprises determining the environment of the vehicle, including whether the wall or another vehicle is disposed on one or more sides of the vehicle as the vehicle is parked, based at least in part on the comparison of the signal strength of the return signals with the historical data stored in the memory.

3. The method of claim 1, wherein: the step of identifying one or more parameters comprises identifying a phase of the return signals; the step of comparing the one or more parameters with historical data comprises comparing the phase of the return signals with the historical data stored in the memory; and the step of determining the environment of the vehicle based comprises determining an environment of the vehicle, including whether the wall or another vehicle is disposed on one or more sides of the vehicle as the vehicle is parked, based at least in part on the comparison of the phase of the return signals with the historical data stored in the memory.

4. The method of claim 1, wherein: the step of identifying one or more parameters comprises identifying a frequency of the return signals; the step of comparing the one or more parameters with historical data comprises comparing the frequency of the return signals with the historical data stored in the memory; and the step of determining an environment of the vehicle based comprises determining the environment of the vehicle, including whether a wall or another vehicle is disposed on one or more sides of the vehicle as the vehicle is parked, based at least in part on the comparison of the frequency of the return signals with the historical data stored in the memory.

5. The method of claim 1, wherein: the step of identifying one or more parameters comprises identifying a timing of the return signals; the step of comparing the one or more parameters with historical data comprises comparing the timing of the return signals with the historical data stored in the memory; and the step of determining an environment of the vehicle based comprises determining the environment of the vehicle, including whether the wall or another vehicle is disposed on one or more sides of the vehicle as the vehicle is parked, based at least in part on the comparison of the timing of the return signals with the historical data stored in the memory.

6. The method of claim 1, wherein the historical data comprises data of one or more parameters of collected data for a test vehicle, prior to a current drive cycle for the vehicle, taken while the test vehicle was located at a plurality of known environments.

7. The method of claim 1, further comprising: providing an adjustment for one or more vehicle systems based at least in part on the environment, including whether the wall or another vehicle is disposed on one or more sides of the vehicle as the vehicle is parked.

8. The method of claim 7, wherein the providing the adjustment comprises: selecting a calibration for one or more vehicle systems based at least in part on the environment, including whether the wall or another vehicle is disposed on one or more sides of the vehicle as the vehicle is parked.

9. The method of claim 7, wherein the providing the adjustment comprises: providing a correction factor for a calibration for one or more vehicle systems based at least in part on the environment, including whether the wall or another vehicle is disposed on one or more sides of the vehicle as the vehicle is parked.

10. The method of claim 1, further comprising: updating the historical data based at least in part on the comparison of the one or more parameters with the historical data.

11. A system comprising: a plurality of sensors configured to at least facilitate: transmitting signals from a vehicle when the vehicle is parked; and receiving return signals at the vehicle after the transmitted signals have contacted one or more objects; and 4a processor coupled to the plurality of sensors and configured to at least facilitate: identifying one or more parameters of the return signals; comparing the one or more parameters with historical data stored in a memory; and determining an environment of the vehicle based at least in part on the comparison of the one or more parameters with the historical data, the environment comprising whether a wall or another vehicle is disposed on one or more sides of the vehicle as the vehicle is parked; and locating a transceiver of a user of the vehicle based on the environment, including based on whether the vehicle has the wall or another vehicle disposed on one or more side of the vehicle as the vehicle is parked.

12. The system of claim 11, wherein: the plurality of sensors are configured to at least facilitate identifying a signal strength of the return signals; and the processor is configured to at least facilitate: comparing the signal strength of the return signals with the historical data stored in the memory; and determining the environment of the vehicle, including whether the wall or another vehicle is disposed on one or more sides of the vehicle as the vehicle is parked, based at least in part on the comparison of the signal strength of the return signals with the historical data stored in the memory.

13. The system of claim 11, wherein: the plurality of sensors are configured to at least facilitate identifying a phase of the return signals; and the processor is configured to at least facilitate: comparing the phase of the return signals with the historical data stored in the memory; and determining the environment of the vehicle, including whether the wall or another vehicle is disposed on one or more sides of the vehicle as the vehicle is parked, based at least in part on the comparison of the phase of the return signals with the historical data stored in the memory.

14. The system of claim 11, wherein: the plurality of sensors are configured to at least facilitate identifying a frequency of the return signals; and the processor is configured to at least facilitate: comparing the frequency of the return signals with the historical data stored in the memory; and determining an environment of the vehicle, including whether a wall or another vehicle is disposed on one or more sides of the vehicle as the vehicle is parked, based at least in part on the comparison of the frequency of the return signals with the historical data stored in the memory.

15. The system of claim 11, wherein: the plurality of sensors are configured to at least facilitate identifying a timing of the return signals; and the processor is configured to at least facilitate: comparing the timing of the return signals with the historical data stored in the memory; and determining the environment of the vehicle, including whether the wall or another vehicle is disposed on one or more sides of the vehicle as the vehicle is parked, based at least in part on the comparison of the timing of the return signals with the historical data stored in the memory.

16. A vehicle comprising: a body; a plurality of sensors disposed onboard the vehicle and configured to at least facilitate: transmitting signals from a vehicle when the vehicle is parked; and 6receiving return signals at the vehicle after the transmitted signals have contacted one or more objects; and a processor disposed onboard the vehicle and coupled to the plurality of sensors, the processor configured to at least facilitate: identifying one or more parameters of the return signals; comparing the one or more parameters with historical data stored in a memory; and determining an environment of the vehicle based at least in part on the comparison of the one or more parameters with the historical data, the environment comprising whether a wall or another vehicle is disposed on one or more sides of the vehicle as the vehicle is parked; and locating a transceiver of a user of the vehicle based on the environment, including based on whether the vehicle has the wall or another vehicle disposed on one or more side of the vehicle as the vehicle is parked.

* * * * *